(12) United States Patent
Ueda

(10) Patent No.: US 11,407,286 B2
(45) Date of Patent: Aug. 9, 2022

(54) VEHICLE

(71) Applicant: SUBARU CORPORATION, Tokyo (JP)

(72) Inventor: Kazuaki Ueda, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 223 days.

(21) Appl. No.: 16/742,031

(22) Filed: Jan. 14, 2020

(65) Prior Publication Data

US 2020/0298669 A1 Sep. 24, 2020

(30) Foreign Application Priority Data

Mar. 19, 2019 (JP) .............................. JP2019-051901

(51) Int. Cl.
| | |
|---|---|
| *B60H 1/00* | (2006.01) |
| *B60H 1/26* | (2006.01) |
| *B60K 11/06* | (2006.01) |
| *F01P 1/06* | (2006.01) |
| *F01P 1/00* | (2006.01) |
| *B60K 1/00* | (2006.01) |

(52) U.S. Cl.
CPC ........... *B60H 1/26* (2013.01); *B60H 1/00278* (2013.01); *B60H 1/00485* (2013.01); *B60K 11/06* (2013.01); *F01P 1/06* (2013.01); *B60H 2001/00178* (2013.01); *B60K 2001/005* (2013.01); *B60K 2001/006* (2013.01); *F01P 2001/005* (2013.01)

(58) Field of Classification Search
CPC ........ B60K 13/06; B60K 11/06; B60K 11/04; B60K 13/02; B60H 1/126; B60H 1/00064; B60H 1/00278
See application file for complete search history.

(56) References Cited

U.S. PATENT DOCUMENTS

| | | | | |
|---|---|---|---|---|
| 5,490,572 A | * | 2/1996 | Tajiri | ................. B60H 1/00392 |
| | | | | 180/65.1 |
| 7,617,897 B2 | * | 11/2009 | Hiroshima | ............. B60K 11/02 |
| | | | | 180/68.4 |
| 7,823,671 B2 | * | 11/2010 | Inoue | ..................... B60L 3/003 |
| | | | | 180/68.4 |

(Continued)

FOREIGN PATENT DOCUMENTS

JP 2018-69809 A 5/2018

*Primary Examiner* — Hau V Phan

(74) *Attorney, Agent, or Firm* — Troutman Pepper Hamilton Sanders LLP

(57) ABSTRACT

A vehicle includes an outside air passage, accommodation cases, an outside air communication opening, an outside air valve, a case communication opening, and a case valve. The outside air passage is capable of allowing outside air to flow through the outside air passage. The accommodation cases are disposed to be compatible with the outside air passage and accommodate predetermined units independently. The outside air communication opening is capable of allowing communication between the outside air passage and the accommodation case. The outside air valve is capable of opening or closing the outside air communication opening. The case communication opening is capable of allowing communication between adjacent ones of the accommodation cases. The case valve is capable of opening or closing the case communication opening.

17 Claims, 6 Drawing Sheets

(56) References Cited

U.S. PATENT DOCUMENTS

| | | | | |
|---|---|---|---|---|
| 8,376,037 B2* | 2/2013 | Nanaumi | ............ | B60H 1/00064 |
| | | | | 165/204 |
| 8,418,791 B2* | 4/2013 | Matsuda | ................ | B60K 13/02 |
| | | | | 180/68.3 |
| 8,662,226 B2* | 3/2014 | Varns | ................ | B60H 1/00278 |
| | | | | 180/68.5 |
| 8,826,893 B2* | 9/2014 | Marsh | ................. | F02B 29/0412 |
| | | | | 123/563 |
| 8,840,496 B2* | 9/2014 | Yamanishi | ............. | B60K 11/08 |
| | | | | 474/144 |
| 9,281,533 B2* | 3/2016 | Ozawa | ............. | H01M 8/04761 |
| 9,616,373 B2* | 4/2017 | Kinsey, Jr. | ......... | B01D 46/2403 |
| 9,878,591 B2* | 1/2018 | Taniguchi | ........... | B60H 1/00278 |
| 10,150,361 B2* | 12/2018 | Thurmeier | ............. | B60L 58/26 |
| 10,179,509 B2* | 1/2019 | Maeda | .................. | B60K 11/06 |
| 10,655,529 B2* | 5/2020 | Kakuta | ................. | F02M 26/06 |
| 10,814,717 B2* | 10/2020 | Okugawa | ............. | B60K 11/04 |
| 2004/0226764 A1* | 11/2004 | Iwasaki | .................. | F28F 9/002 |
| | | | | 180/68.1 |
| 2005/0029027 A1* | 2/2005 | Kunikata | ............... | B60K 11/04 |
| | | | | 180/68.1 |
| 2009/0277707 A1* | 11/2009 | Ballard | ................ | F04D 29/661 |
| | | | | 180/68.2 |
| 2013/0022432 A1* | 1/2013 | Spitler | ...................... | F01P 5/06 |
| | | | | 414/467 |
| 2013/0228388 A1* | 9/2013 | Ueda | ...................... | B60K 13/06 |
| | | | | 180/68.1 |
| 2018/0111483 A1 | 4/2018 | Nakayama | | |

\* cited by examiner

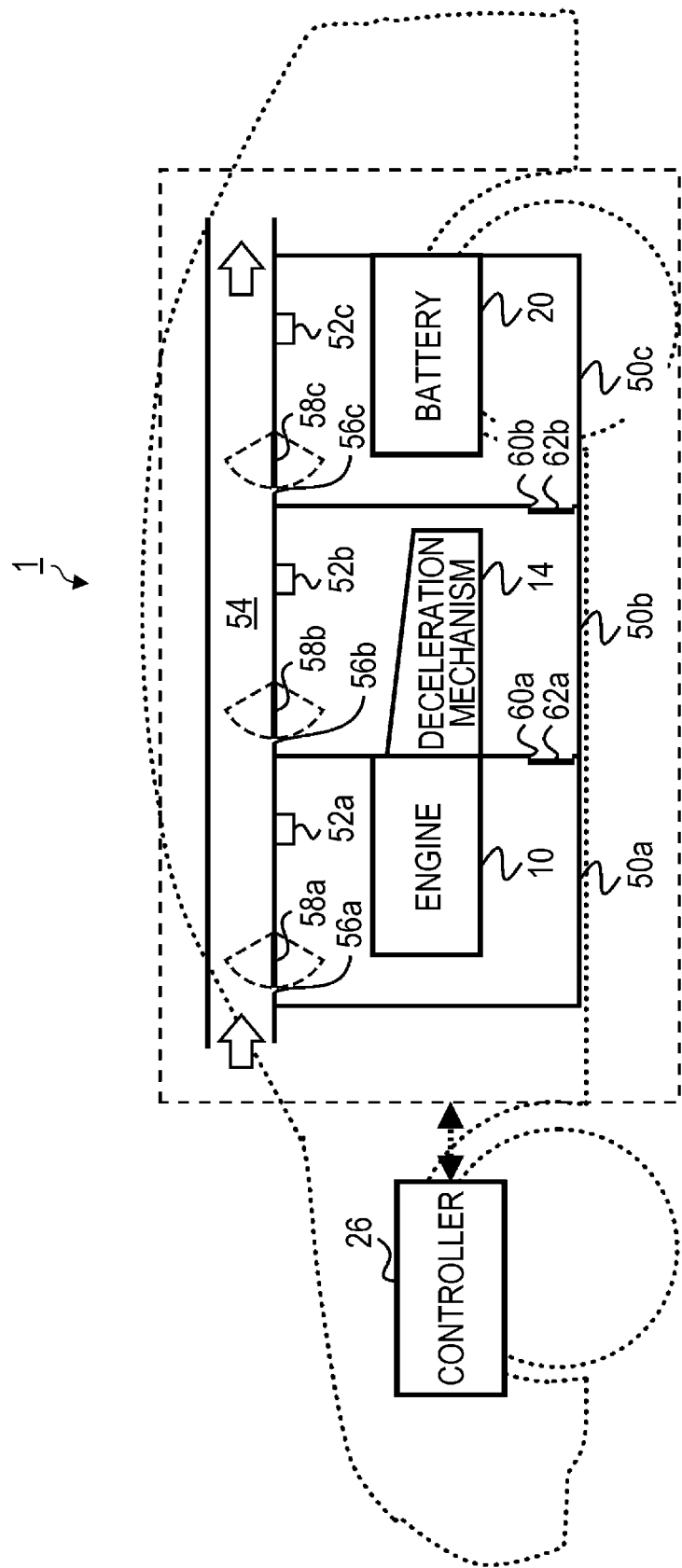

FIG. 4

| NO. | EV MODE | THERMOMETER 52a ≥UPPER LIMIT TEMPERATURE | THERMOMETER 52b ≥UPPER LIMIT TEMPERATURE | THERMOMETER 52c ≥UPPER LIMIT TEMPERATURE | OUTSIDE AIR VALVE 58a | OUTSIDE AIR VALVE 58b | OUTSIDE AIR VALVE 58c | ADJACENT VALVE 62a | ADJACENT VALVE 62b | CONDITION DETERMINATION |
|---|---|---|---|---|---|---|---|---|---|---|
| 1 | O | O | O | O | OPEN | CLOSED | OPEN | OPEN | OPEN | 2ND CONDITION DETERMINATION |
| 2 | O | O | O | × | OPEN | OPEN | CLOSED | OPEN | CLOSED | 2ND CONDITION DETERMINATION |
| 3 | O | O | × | O | OPEN | CLOSED | OPEN | CLOSED | CLOSED | 1ST CONDITION DETERMINATION |
| 4 | O | O | × | × | OPEN | CLOSED | CLOSED | CLOSED | OPEN | 1ST OR 3RD CONDITION DETERMINATION |
| 5 | O | × | O | O | CLOSED | CLOSED | CLOSED | OPEN | OPEN | 4TH CONDITION DETERMINATION |
| 6 | O | × | O | × | CLOSED | CLOSED | CLOSED | OPEN | OPEN | 4TH CONDITION DETERMINATION |
| 7 | O | × | × | O | CLOSED | CLOSED | CLOSED | OPEN | OPEN | 4TH CONDITION DETERMINATION |
| 8 | O | × | × | × | CLOSED | CLOSED | CLOSED | OPEN | OPEN | 4TH CONDITION DETERMINATION |
| 9 | × | O | O | O | OPEN | CLOSED | OPEN | OPEN | CLOSED | 2ND CONDITION DETERMINATION |
| 10 | × | O | O | × | OPEN | OPEN | CLOSED | CLOSED | CLOSED | 2ND CONDITION DETERMINATION |
| 11 | × | O | × | O | OPEN | CLOSED | OPEN | CLOSED | OPEN | 1ST OR 3RD CONDITION DETERMINATION |
| 12 | × | O | × | × | OPEN | OPEN | CLOSED | CLOSED | OPEN | 2ND CONDITION DETERMINATION |
| 13 | × | × | O | O | CLOSED | OPEN | OPEN | OPEN | CLOSED | 2ND CONDITION DETERMINATION |
| 14 | × | × | O | × | CLOSED | CLOSED | CLOSED | OPEN | CLOSED | 1ST CONDITION DETERMINATION |
| 15 | × | × | × | O | CLOSED | CLOSED | OPEN | OPEN | CLOSED | 1ST OR 3RD CONDITION DETERMINATION |
| 16 | × | × | × | × | CLOSED | CLOSED | CLOSED | OPEN | OPEN | 3RD CONDITION DETERMINATION |

VEHICLE

CROSS-REFERENCE TO RELATED APPLICATIONS

The present application claims priority from Japanese Patent Application No. 2019-051901 filed on Mar. 19, 2019, the entire contents of which are hereby incorporated by reference.

BACKGROUND

The disclosure relates to vehicles equipped with power sources.

Japanese Unexamined Patent Application Publication No. 2018-069809 discloses a vehicle where a plurality of module groups are accommodated in respective cases.

SUMMARY

An aspect of the disclosure provides a vehicle including an outside air passage, accommodation cases, an outside air communication opening, an outside air valve, a case communication opening, and a case valve. The outside air passage is capable of allowing outside air to flow through the outside air passage. The accommodation cases are disposed to be compatible with the outside air passage and accommodate predetermined units independently. The outside air communication opening is capable of allowing communication between the outside air passage and the accommodation case. The outside air valve is capable of opening or closing the outside air communication opening. The case communication opening is capable of allowing communication between adjacent ones of the accommodation cases. The case valve is capable of opening or closing the case communication opening.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

FIG. 2 is an explanatory diagram for describing a cooling mechanism in the vehicle;

FIG. 4 presents tables for describing operations of a controller;

DETAILED DESCRIPTION

Units such as an engine, a deceleration mechanism, a battery, and the like may be accommodated in respective cases. Accordingly, the cases surround the corresponding units and form spaces partitioned from each other.

Units such as an engine, a deceleration mechanism, a battery, and the like may gain heat as a vehicle travels. When these units are accommodated in respective cases, the heat may stay in the spaces and sufficient cooling may fail. As a result, the temperature in each case may rise excessively.

Thus, it is desired to provide a vehicle that enables enhancement of cooling effect while units are accommodated in respective cases.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
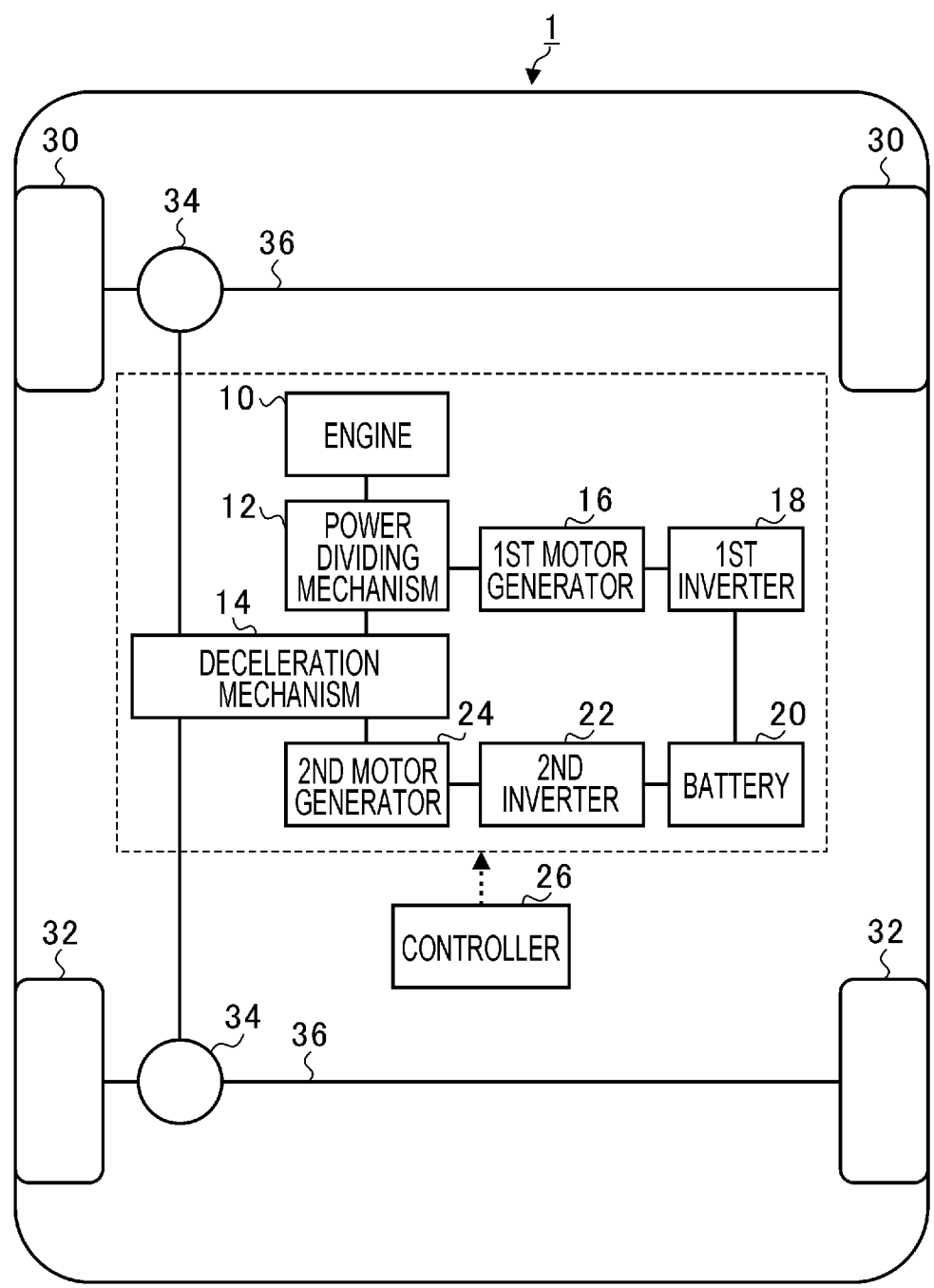
FIG. 1 is a schematic diagram illustrating a configuration of a vehicle according to an embodiment of the disclosure.

FIG. 1 is a schematic diagram illustrating a configuration of a vehicle 1 according to an embodiment of the disclosure. The vehicle 1 is, for example, a series/parallel (power split) hybrid vehicle (a hybrid automobile). Although a hybrid vehicle is described herein as an example, the vehicle 1 is not limited to the hybrid vehicle.

The vehicle 1 includes an engine 10, a power dividing mechanism 12, a deceleration mechanism 14, a first motor generator 16, a first inverter 18, a battery 20, a second inverter 22, a second motor generator 24, and a controller 26.

For example, the engine 10 causes a piston to perform reciprocating motion with fuel burnt, which is gasoline, light oil, or the like, and changes the reciprocating motion into rotary motion of a crankshaft through a connecting rod. The crankshaft is coupled to an output shaft of the engine 10.

The power dividing mechanism 12 includes, for example, a planetary gear mechanism made up of a sun gear, planetary gears, a ring gear, and a carrier. The sun gear is coupled to a rotary shaft of the first motor generator 16. The ring gear is disposed diametrically further outside than the sun gear. The central axis of the ring gear agrees with the central axis of the sun gear. The ring gear is coupled to the deceleration mechanism 14. The plurality of planetary gears are disposed between the sun gear and the ring gear and are engaged with the sun gear and the ring gear. The carrier supports the plurality of planetary gears rotatably. The carrier is coupled to the output shaft of the engine 10. Thus, the power dividing mechanism 12 divides the power of the engine 10 into power for rotating the first motor generator 16 and power for rotating front wheels 30 and rear wheels 32.

The deceleration mechanism (transmission) 14 includes a plurality of gear mechanisms. The deceleration mechanism 14 reduces the rotation speed of the ring gear of the power dividing mechanism 12 and the rotation speed of the second motor generator 24 to output the reduced rotation speeds. The deceleration mechanism 14 transmits power to the front wheels 30 and the rear wheels 32 through a differential gear 34 and a drive shaft 36.

The first motor generator 16 chiefly functions as a generator and generates electricity by a rotor rotating with the rotation of the sun gear of the power dividing mechanism 12. The first inverter 18 converts alternating-current (AC) power generated by the first motor generator 16 into direct-current (DC) power and supplies the resultant power to the battery 20.

Under acceleration of the vehicle 1, the second inverter 22 converts DC power supplied from the battery 20 into desired AC power and supplies the resultant power to the second motor generator 24. At this time, the second motor generator 24 functions as a motor and generates power. A rotor of the second motor generator 24 is coupled to the deceleration mechanism 14. The power of the second motor generator 24 is transmitted from the front wheels 30 and the rear wheels 32 through the deceleration mechanism 14.

The controller 26 is constituted by a semiconductor integrated circuit including a central processing unit (CPU), ROM where a program and the like are stored, RAM as a work area, and so on and controls the vehicle 1 overall. In the present embodiment, the controller 26 controls the opening and closing of outside air valves 58a, 58b, and 58c and case valves 62a and 62b, which are described later.

FIG. 2 is an explanatory diagram for describing a cooling mechanism in the vehicle 1. The objects to be cooled are herein the engine 10, the deceleration mechanism 14, and the battery 20. As illustrated in FIG. 2, the engine 10 is disposed in a forward portion of the vehicle 1 and the deceleration mechanism 14 is coupled to the output shaft of the engine 10. The battery 20 is disposed in a rearward portion of the vehicle 1. Herein, for convenience of explanation, the engine 10, the deceleration mechanism 14, and the battery 20 are simply aligned in this order.

The engine 10, the deceleration mechanism 14, and the battery 20 are accommodated in accommodation cases (capsules) 50a, 50b, and 50c, respectively, which may be referred to as the accommodation cases 50 collectively. The accommodation cases 50a, 50b, and 50c function not only for dustproofing and waterproofing but also for shock absorbing. The accommodation cases 50a, 50b, and 50c surround the engine 10, the deceleration mechanism 14, and the battery 20, respectively, and form spaces partitioned from each other. The accommodation case 50c may also accommodate the second inverter 22 in addition to the battery 20. It is not essential for the accommodation cases 50a, 50b, and 50c to be hermetically sealed. Thermometers 52a, 52b, and 52c are provided in the accommodation cases 50a, 50b, and 50c, respectively, which detect the respective temperatures of the inner spaces.

An outside air passage 54 is provided near the engine 10, the deceleration mechanism 14, and the battery 20 to be ready for the engine 10, the deceleration mechanism 14, and the battery 20. As the blank arrows in FIG. 2 indicate, the outside air passage 54 delivers outside air taken from a forward portion of the vehicle 1 to units such as the engine 10, the deceleration mechanism 14, the battery 20, and the like. Herein, outside air communication openings 56a, 56b, and 56c, which allow communication with the outside air passage 54, are provided in the accommodation cases 50a, 50b, and 50c, respectively. The outside air communication openings 56a, 56b, and 56c are provided with outside air valves 58a, 58b, and 58c, which may be referred to as the outside air valves 58 collectively. The outside air valves 58a, 58b, and 58c open or close the outside air communication openings 56a, 56b, and 56c, respectively, in accordance with a command from the controller 26.

As illustrated in FIG. 2, the outside air valves 58a, 58b, and 58c pivot about hinges into the outside air passage 54 and into the accommodation cases 50. Each hinge serves as a pivot axis and is positioned downstream in outside air in the outside air passage 54. Thus, the outside air valves 58a, 58b, and 58c are each controlled so as to be at one of three positions, namely a position in the outside air passage (hereinafter referred to as an outside air passage position), a closed position, and a position in the accommodation case (hereinafter referred to as an accommodation case position). When the outside air valves 58a, 58b, and 58c are at the outside air passage positions or the accommodation case positions, air moves through the accommodation cases 50a, 50b, and 50c and the outside air passage 54, and heat is exchanged between the spaces. When the outside air valves 58a, 58b, and 58c are at the outside air passage positions, in addition to heat exchange, outside air is actively taken into the accommodation cases 50a, 50b, and 50c from the outside air passage 54.

The accommodation cases 50a, 50b, and 50c of the engine 10, the deceleration mechanism 14, and the battery 20 are provided with case communication openings 60a and 60b that allow communication between adjacent ones of the accommodation cases 50a, 50b, and 50c. Specifically, the case communication opening 60a allows communication between the accommodation cases 50a and the accommodation cases 50b, and the case communication opening 60b allows communication between the accommodation cases 50b and the accommodation cases 50c. Herein, an example is described in which the accommodation cases 50a and 50b are adjacent to each other while the accommodation cases 50b and 50c are adjacent to each other. It is therefore satisfactory for the case communication openings 60a and 60b to be mere holes. If the accommodation cases 50a, 50b, and 50c are separated from each other, the case communication openings 60a and 60b use ducts or the like to enable communication between the accommodation cases 50a, 50b, and 50c. The case communication openings 60a and 60b are provided with the case valves 62a and 62b, respectively, which may be referred to as the case valves 62 collectively. The case valves 62a and 62b open or close the case communication openings 60a and 60b, respectively, in accordance with a command from the controller 26.

The case valves 62a and 62b are constituted by slide shutters and are each controlled so as to be at one of two positions, namely an open position and a closed position. When the case valves 62a and 62b are at open positions, the accommodation cases 50a, 50b, and 50c mutually communicate and heat is exchanged between the spaces. Although an example is described in which shutters constitute the case valves 62a and 62b, similar to the outside air valves 58a, 58b, and 58c, the case valves 62a and 62b may each pivot about a hinge that serves as a pivot axis.

The controller 26 acquires the respective temperatures of the accommodation cases 50a, 50b, and 50c from the thermometers 52a, 52b, and 52c. On the basis of whether the acquired temperatures satisfy cooling conditions, (e.g. whether the acquired temperatures are higher than or equal to the upper limit temperatures set for the accommodation cases 50), the controller 26 controls the opening and closing of the outside air valves 58a, 58b, and 58c, and the case valves 62a and 62b. Specifically, the controller 26 causes the outside air valves 58a, 58b, and 58c, and the case valves 62a and 62b to be open or closed in accordance with four condition determinations, which are described below.

FIGS. 3A to 3F are explanatory diagrams for describing the condition determinations. The priorities of the four condition determinations become higher as the value of the priority increases. That is, the priorities work as follows: the first (1st) condition determination< the second (2nd) condition determination< the third (3rd) condition determination< the fourth (4th) condition determination. If the condition determinations conflict, the condition determination larger in the value of the priority is adopted. In FIGS. 3A to 3F, for convenience of explanation, only the accommodation cases 50, the outside air passage 54, the outside air valves 58*a*, 58*b*, and 58*c*, and the case valves 62*a* and 62*b* are used in describing their operations.

In the first condition determination, if the accommodation cases 50 satisfy the cooling conditions, that is, the temperatures are higher than or equal to the respective upper limit temperatures set for the accommodation cases 50*a*, 50*b*, and 50*c*, the outside air valves 58*a*, 58*b*, and 58*c* corresponding to the accommodation cases 50*a*, 50*b*, and 50*c* are caused to be open (at outside air passage positions or accommodation case positions). For example, if the temperature acquired from the thermometer 52*a* is higher than or equal to the upper limit temperature of the accommodation case 50*a*, as in FIG. 3A, the outside air valve 58*a* is caused to pivot to an accommodation case position. Thus, as a result of heat exchange performed between the accommodation case 50*a* and the outside air passage 54, the engine 10 in the accommodation case 50*a* is cooled.

In the second condition determination, all of the plurality of accommodation cases 50 that are contiguous satisfy the cooling conditions, the case valves 62*a* and 62*b* between the accommodation cases 50 that are contiguous are caused to be open and the outside air valves 58*a*, 58*b*, and 58*c* corresponding to the accommodation cases 50 at a front end and a rear end relative to outside air are caused to be open (at outside air passage positions or accommodation case positions). For example, if the temperatures acquired from the thermometers 52*a* and 52*b* are higher than or equal to the respective upper limit temperatures of the accommodation cases 50*a* and 50*b*, as in FIG. 3B, the case valve 62*a* between the accommodation cases 50*a* and 50*b* is caused to be open, and the outside air valve 58*a* corresponding to the accommodation case 50*a* at the front end is caused to pivot to an outside air passage position and the outside air valve 58*b* corresponding to the accommodation case 50*b* at the rear end is caused to pivot to an accommodation case position. Thus, as a result of actively taking outside air from the accommodation case 50*a* and causing the outside air to circulate through the accommodation case 50*b*, the engine 10 in the accommodation case 50*a* and the deceleration mechanism 14 in the accommodation case 50*b* are cooled.

Figure 3A:
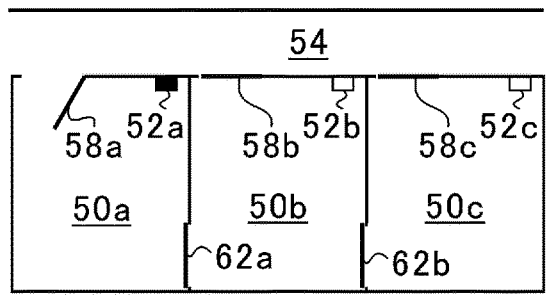
FIGS. 3A to 3F are explanatory diagrams for describing condition determinations.
Figure 3D:
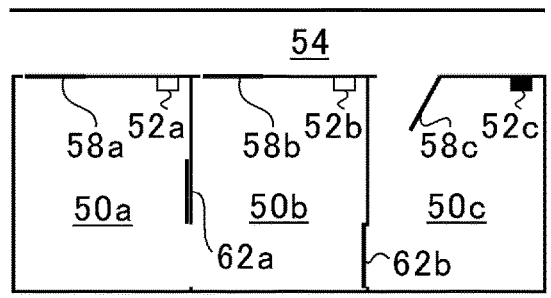
Figure 3B:
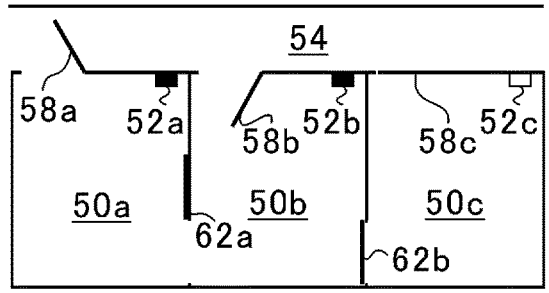
Figure 3E:
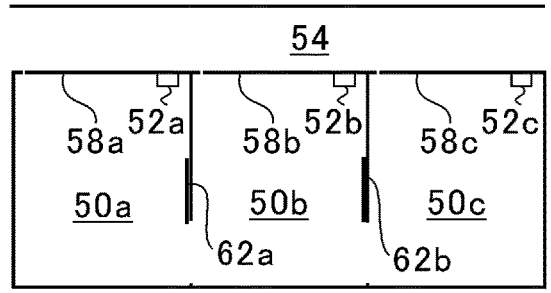
Figure 3C:
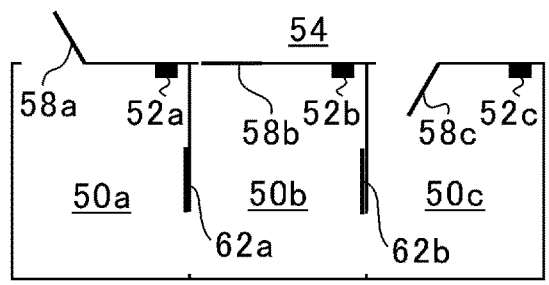
Figure 3F:
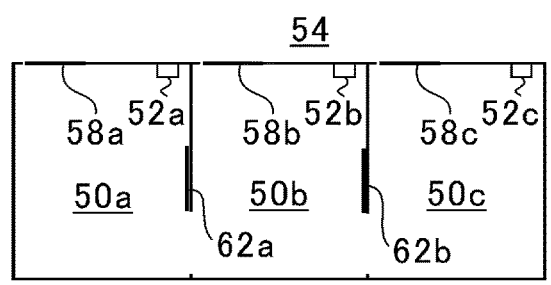

Similarly, if the temperatures acquired from the thermometers 52*a*, 52*b*, and 52*c* are higher than or equal to the respective upper limit temperatures of the accommodation cases 50*a*, 50*b*, and 50*c*, as in FIG. 3C, the case valve 62*a* between the accommodation cases 50*a* and 50*b* and the case valve 62*b* between the accommodation cases 50*b* and 50*c* are caused to be open, and the outside air valve 58*a* corresponding to the accommodation case 50*a* at the front end is caused to pivot to an outside air passage position and the outside air valve 58*c* corresponding to the accommodation case 50*c* at the rear end is caused to pivot to an accommodation case position. Thus, as a result of actively taking outside air from the accommodation case 50*a* and causing the outside air to circulate through the accommodation case 50*b* and the accommodation case 50*c*, the units in the accommodation cases 50*a*, 50*b*, and 50*c* are cooled.

In this example, to secure a circulation path in the accommodation cases 50*a*, 50*b*, and 50*c*, the outside air valve 58*b* corresponding to the accommodation case 50*b* that is different from the accommodation cases at the front end and the rear end is caused to be closed. However, the embodiment is not limited to this example. The outside air valve 58*b* may be caused to be open (at an outside air passage position or an accommodation case position).

In the third condition determination, if none of the plurality of accommodation cases 50 that are contiguous satisfy the cooling conditions, the case valves 62 between the accommodation cases 50 that are contiguous and do not satisfy the cooling conditions are caused to be open. For example, the temperatures acquired from the thermometers 52*a* and 52*b* are lower than the respective upper limit temperatures of the accommodation cases 50*a* and 50*b*, as in FIG. 3D, the case valve 62*a* between the accommodation cases 50*a* and 50*b* is caused to be open and the outside air valves 58*a* and 58*b* corresponding to the accommodation cases 50*a* and 50*b* are caused to be closed.

Similarly, if the temperatures acquired from the thermometers 52*a*, 52*b*, and 52*c* are lower than the respective upper limit temperatures of the accommodation cases 50*a*, 50*b*, and 50*c*, as in FIG. 3E, the case valve 62*a* between the accommodation cases 50*a* and 50*b* and the case valve 62*b* between the accommodation cases 50*b* and 50*c* are caused to be open, and the outside air valves 58*a*, 58*b*, and 58*c* corresponding to the accommodation cases 50*a*, 50*b*, and 50*c* are caused to be closed. Thus, the temperatures of the accommodation cases 50 that have not satisfied the cooling conditions yet can be balanced with each other and a unit low in temperature can be warmed while avoiding rise in the temperature of part of heat sources.

In the fourth condition determination, if when the vehicle 1 travels in an EV mode (of a hybrid vehicle, in which the second motor generator 24 is used in driving the vehicle), the accommodation case 50*a* that accommodates the engine 10 does not satisfy the cooling condition, the case valves 62 between all of the accommodation cases 50 that are contiguous are caused to be open. For example, if in the EV mode, the temperature acquired from the thermometer 52*a* is lower than the upper limit temperature of the accommodation case 50*a*, as in FIG. 3F, the case valve 62*a* between the accommodation cases 50*a* and 50*b* is caused to be open, the case valve 62*b* between the accommodation cases 50*b* and 50*c* is caused to be open, and the outside air valves 58*a*, 58*b*, and 58*c* corresponding to the accommodation cases 50*a*, 50*b*, and 50*c* are caused to be closed. Thus, the temperatures of the accommodation cases 50 can be balanced with each other in the EV mode. Accordingly, it is enabled to perform warming to start or restart the engine 10 that is unlikely to gain heat in the EV mode.

FIG. 4 presents tables for describing operations of the controller 26. FIGS. 5A to 5I are diagrams illustrating the results of the operations. In FIG. 4, "◯" indicates that the vehicle 1 travels in the EV mode and the cooling condition is satisfied while "x" indicates that the vehicle 1 travels in a mode different from the EV mode and the cooling condition is not satisfied. In FIG. 4, accordingly, "OPEN" indicates that the outside air valves 58*a*, 58*b*, and 58*c*, and the case valves 62*a* and 62*b* are caused to be open while "CLOSED" indicates that the outside air valves 58*a*, 58*b*, and 58*c*, and the case valves 62*a* and 62*b* are caused to be closed.

For example, it is assumed that, as indicated with No. 1 in FIG. 4, the vehicle 1 travels in the EV mode (which is hereinafter expressed as "the EV=◯") and all of the cooling conditions are satisfied (which is hereinafter expressed as "the thermometer 52*a*=◯", "the thermometer 52*b*=◯", and "the thermometer 52*c*=◯"). In this example, the second condition determination is applied, and as in FIG. 5A, the outside air valve 58*a*=open, the outside air valve 58*b*=closed, the outside air valve 58*c*=open, the case valve 62*a*=open, and the case valve 62*b*=open.

Figure 5A:
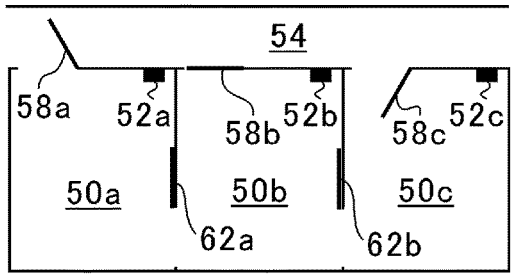
FIGS. 5A to 5I are explanatory diagrams illustrating the results of the operations.
Figure 5F:
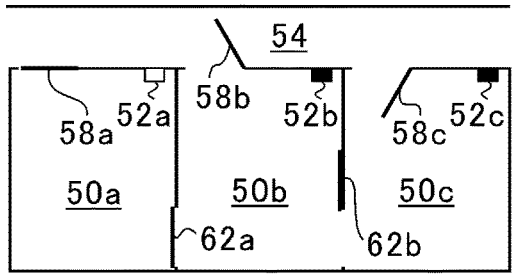
Figure 5B:
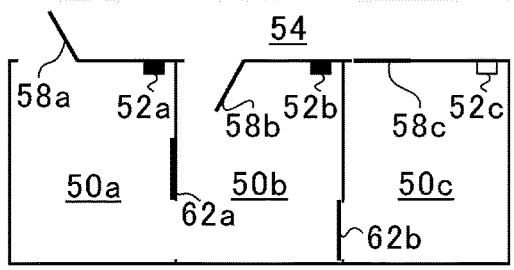

As indicated with No. 2 in FIG. 4, if the EV=○, the thermometer 52a=○, the thermometer 52b=○, and the thermometer 52c=x, the second condition determination is applied, and as in FIG. 5B, the outside air valve 58a=open, the outside air valve 58b=open, the outside air valve 58c=closed, the case valve 62a=open, and the case valve 62b=closed.

Figure 5G:
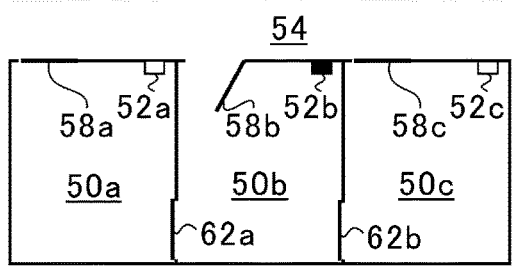
Figure 5C:
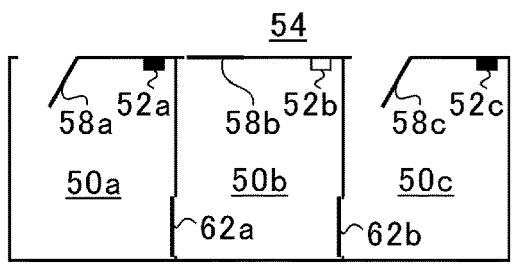

As indicated with No. 3 in FIG. 4, if the EV=0, the thermometer 52a=○, the thermometer 52b=x, and the thermometer 52c=○, the first condition determination is applied, and as in FIG. 5C, the outside air valve 58a=open, the outside air valve 58b=closed, the outside air valve 58c=open, the case valve 62a=closed, and the case valve 62b=closed.

Figure 5H:
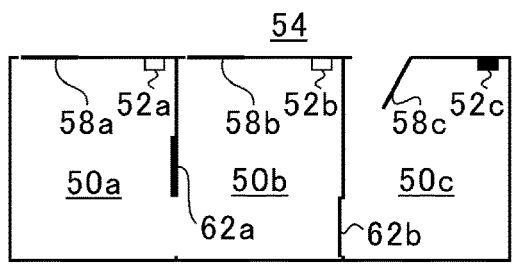
Figure 5D:
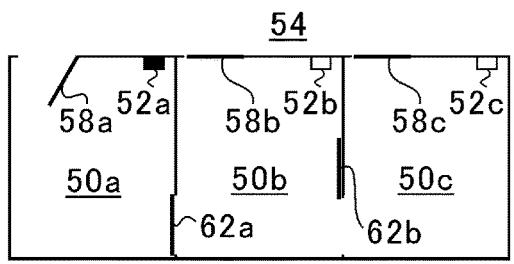

As indicated with No. 4 in FIG. 4, if the EV=○, the thermometer 52a=○, the thermometer 52b=x, and the thermometer 52c=x, the first condition determination is applied to the thermometer 52a and the third condition determination is applied to the thermometers 52b and 52c, and as in FIG. 5D, the outside air valve 58a=open, the outside air valve 58b=closed, the outside air valve 58c=closed, the case valve 62a=closed, and the case valve 62b=open.

Figure 5I:
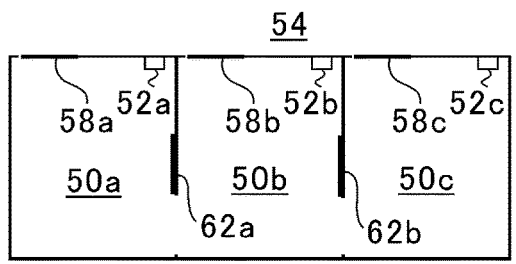
Figure 5E:
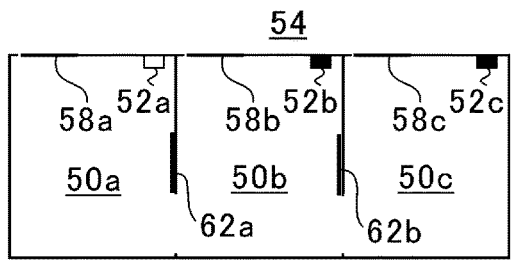

As indicated with Nos. 5 to 8 in FIG. 4, if the EV=○ and the thermometer 52a=x, regardless of the temperatures of the other thermometers 52b and 52c, the fourth condition determination is applied, and as in FIG. 5E, the outside air valve 58a=closed, the outside air valve 58b=closed, the outside air valve 58c=closed, the case valve 62a=open, and the case valve 62b=open.

In Nos. 9 to 12 in FIG. 4, regardless of the status about the EV, the valves are caused to be open or closed through the condition determinations identical to the condition determinations corresponding to Nos. 1 to 4, respectively (see FIG. 5A to 5D).

As indicated with No. 13 in FIG. 4, if the EV=x, the thermometer 52a=x, the thermometer 52b=○, and the thermometer 52c=○, the second condition determination is applied, and as in FIG. 5F, the outside air valve 58a=closed, the outside air valve 58b=open, the outside air valve 58c=open, the case valve 62a=closed, and the case valve 62b=open.

As indicated with No. 14 in FIG. 4, if the EV=x, the thermometer 52a=x, the thermometer 52b=○, and the thermometer 52c=x, the first condition determination is applied, and as in FIG. 5G, the outside air valve 58a=closed, the outside air valve 58b=open, the outside air valve 58c=closed, the case valve 62a=closed, and the case valve 62b=closed.

As indicated with No. 15 in FIG. 4, if the EV=x, the thermometer 52a=x, the thermometer 52b=x, and the thermometer 52c=○, the third condition determination is applied to the thermometers 52a and 52b and the first condition determination is applied to the thermometer 52c, and as in FIG. 5H, the outside air valve 58a=closed, the outside air valve 58b=closed, the outside air valve 58c=open, the case valve 62a=open, and the case valve 62b=closed.

As indicated with No. 16 in FIG. 4, if the EV=x, the thermometer 52a=x, the thermometer 52b=x, and the thermometer 52c=x, the third condition determination is applied, and as in FIG. 5I, the outside air valve 58a=closed, the outside air valve 58b=closed, the outside air valve 58c=closed, the case valve 62a=open, and the case valve 62b=open.

Thus, cooling effect on the engine 10, the deceleration mechanism 14, and the battery 20 can be enhanced while units including the engine 10, the deceleration mechanism 14, and the battery 20 are accommodated in the accommodation cases 50a, 50b, and 50c, respectively.

The description above is made by employing examples where, on the basis of whether the vehicle 1 is in the EV mode and the temperatures of the thermometers 52a, 52b, and 52c are higher than or equal to the upper limit temperatures, the controller 26 causes the outside air valves 58a, 58b, and 58c, and the case valves 62a and 62b to be open or closed as in FIG. 4. It is herein satisfactory as long as the condition determinations are made appropriately. Various already-existing techniques can be used to configure the logic itself for obtaining the results in FIG. 4. An example thereof is presented below.

Figure 6:
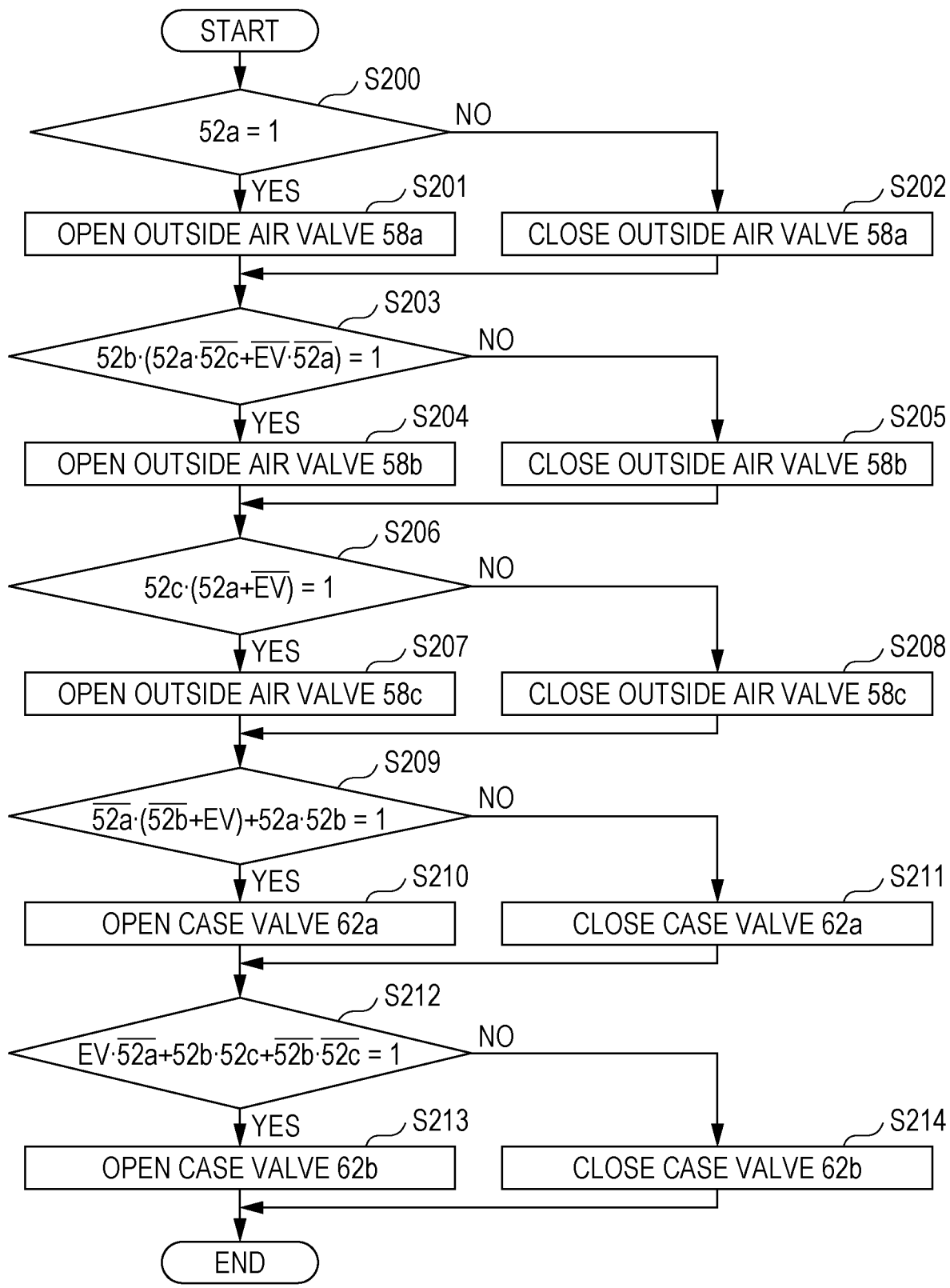
FIG. 6 is a flow chart for describing a procedure of specific operations of the controller.

FIG. 6 is a flow chart for describing a procedure of specific operations of the controller 26. In this example, logical values indicate whether the vehicle 1 is in the EV mode and whether the temperatures of the thermometers 52a, 52b, and 52c are higher than or equal to the upper limit temperature. If ○ is indicated in FIG. 4, 1 represents the logical value. If x is indicated in FIG. 4, 0 represents the logical value. Depending on the result of the logical operation that indicates 1, the procedure branches. In FIG. 6, "EV", "52a", "52b", and "52c" simply represent the EV mode and the logical values of the thermometers 52a, 52b, and 52c, respectively, while "•", "+", and a bar represent AND (logical conjunction), OR (logical inclusion), and NOT (logical negation), respectively. For example, in FIG. 6, the "EV" with a bar placed thereabove indicates that the condition is that the logical value of the EV mode is 0.

Specifically, the controller 26 determines whether the temperature of the thermometer 52a is higher than or equal to the upper limit temperature, that is, whether the logical value of the thermometer 52a is 1 (S200). After that, if the logical value of the thermometer 52a is 1, the controller 26 causes the outside air valve 58a to be open (S201). If the logical value is 0, the controller 26 causes the outside air valve 58a to be closed (S202).

Next, the controller 26 determines whether the logical value of the thermometer 52b is 1 and [whether the logical value of the thermometer 52a is 1 and the logical value of the thermometer 52c is 0], or [whether the logical value of the EV mode is 0 and the logical value of the thermometer 52a is 0] (S203). If the result of the logical operation is 1, the controller 26 causes the outside air valve 58b to be open (S204). If the logical value is 0, the controller 26 causes the outside air valve 58b to be closed (S205).

Subsequently, the controller 26 determines whether the logical value of the thermometer 52c is 1 and [whether the logical value of the thermometer 52a is 1 or the logical value of the EV mode is 0] (S206). If the result of the logical operation is 1, the controller 26 causes the outside air valve 58c to be open (S207). If the logical value is 0, the controller 26 causes the outside air valve 58c to be closed (S208).

After that, the controller 26 determines [whether the logical value of the thermometer 52a is 0 and [whether the logical value of the thermometer 52b is 0 or the logical value of the EV mode is 1]], or [whether the logical value of the thermometer 52a is 1 and the logical value of the thermometer 52b is 1] (S209). If the result of the logical operation is 1, the controller 26 causes the case valve 62a to be open (S210). If the logical value is 0, the controller 26 causes the case valve 62a to be closed (S211).

Subsequently, the controller 26 determines [whether the logical value of the EV mode is 1 and the logical value of the thermometer 52a is 0], or [whether the logical value of the thermometer 52b is 1 and the logical value of the thermometer 52c is 1], or [whether the logical value of the thermometer 52b is 0 and the logical value of the thermometer 52c is 0] (S212). If the result of the logical operation is 1, the controller 26 causes the case valve 62b to be open (S213). If the logical value is 0, the controller 26 causes the case valve 62b to be closed (S214).

In this example, on the basis of whether the vehicle 1 is in the EV mode and whether the temperatures of the thermometers 52a, 52b, and 52c are higher than or equal to the upper limit temperatures, the controller 26 controls the outside air valves 58a, 58b, and 58c, and the case valves 62a and 62b, independently. Thus, cooling effect on the engine 10, the deceleration mechanism 14, and the battery 20 can be enhanced with reliability.

Although an embodiment of the disclosure is described above with reference to the accompanying drawings, the disclosure is not limited to the present embodiment. A person skilled in the art can conceive many variations and modifications within the scope recited in the aspects of the disclosure. Such variations and modifications are also understood as belonging to the technical scope of the disclosure.

For example, the foregoing embodiment describes the engine 10, the deceleration mechanism 14, and the battery 20 that are accommodated in the three accommodation cases 50a, 50b, and 50c, respectively. However, the disclosure is not limited to this example. As long as the condition determinations described with reference to FIGS. 3A to 3F and FIG. 4 are used, the number of the accommodation cases 50 may be two or be four or more.

If the number of the accommodation cases 50 is two, for example, the engine 10 may be accommodated in one of the accommodation cases 50 and the deceleration mechanism 14 and the battery 20 may be accommodated together in the other accommodation case 50. For another example, if the number of the accommodation cases 50 is two, the engine 10 and the deceleration mechanism 14 may be accommodated together in one of the accommodation cases 50 and the battery 20 may be accommodated in the other accommodation case 50.

In the foregoing embodiment, an example is described in which the controller 26 performs control so that the outside air valves 58a, 58b, and 58c are at one of three positions, namely an outside air passage position, a closed position, and an accommodation case position. The disclosure is not limited to this example, however. The controller 26 may perform control so that the outside air valves 58a, 58b, and 58c are at one of two positions, namely an open position and a closed position.

In the flow chart described with reference to FIG. 6, an example is presented in which the outside air valves 58a, 58b, and 58c, and the case valves 62a and 62b undergo immediate control to be opened or closed on the basis of whether the temperatures of the thermometers 52a, 52b, and 52c are higher than or equal to the upper limit temperatures. Around the upper limit temperatures, however, chattering can be caused by variation in temperature. Thus, if after the temperature becomes higher than or equal to the upper limit temperature, the temperature is not lowered to a predetermined temperature lower than the upper limit temperature, the opening and closing may not be reversed, that is a chatterless process may be performed.

The disclosure enables enhancement of cooling effect while units are accommodated in respective cases.

The invention claimed is:

1. A vehicle comprising:
an outside air passage capable of allowing outside air to flow through the outside air passage;
accommodation cases that are disposed to be compatible with the outside air passage and accommodate predetermined units independently;
an outside air communication opening capable of allowing communication between the outside air passage and the accommodation case;
an outside air valve capable of opening or closing the outside air communication opening;
a case communication opening capable of allowing communication between adjacent ones of the accommodation cases;
a case valve capable of opening or closing the case communication opening; and
if, in an electric vehicle mode, the accommodation case which accommodates an engine does not satisfy a cooling condition, the case valves between all of the accommodation cases which are contiguous are caused to be open and the outside air valves corresponding to all of the contiguous accommodation cases are caused to be closed.

2. The vehicle according to claim 1, wherein
if the accommodation case satisfies a cooling condition, the outside air valve corresponding to the accommodation case is caused to be open.

3. The vehicle according to claim 2, wherein
if, in an electric vehicle mode, the accommodation case which accommodates an engine does not satisfy a cooling condition, the case valves between all of the accommodation cases which are contiguous are caused to be open and the outside air valves corresponding to all of the contiguous accommodation cases are caused to be closed.

4. The vehicle according to claim 1, wherein
if all of the accommodation cases which are contiguous satisfy cooling conditions, the case valve between the contiguous accommodation cases and the outside air valves corresponding to the accommodation cases at a front end and a rear end relative to the outside air are caused to be open.

5. The vehicle according to claim 4, wherein
if, in an electric vehicle mode, the accommodation case which accommodates an engine does not satisfy a cooling condition, the case valves between all of the accommodation cases which are contiguous are caused to be open and the outside air valves corresponding to all of the contiguous accommodation cases are caused to be closed.

6. The vehicle according to claim 1, wherein
if none of the accommodation cases which are contiguous satisfies cooling conditions, the case valve between the contiguous accommodation cases is caused to be open and the outside air valves corresponding to all of the contiguous accommodation cases are caused to be closed.

7. The vehicle according to claim 6, wherein
if, in an electric vehicle mode, the accommodation case which accommodates an engine does not satisfy a cooling condition, the case valves between all of the accommodation cases which are contiguous are caused to be open and the outside air valves corresponding to all of the contiguous accommodation cases are caused to be closed.

8. The vehicle according to claim 1, wherein
if, in an electric vehicle mode, the accommodation case which accommodates an engine does not satisfy a cooling condition, the case valves between all of the accommodation cases which are contiguous are caused to be open and the outside air valves corresponding to all of the contiguous accommodation cases are caused to be closed.

9. The vehicle according to claim 1, wherein
if, in an electric vehicle mode, the accommodation case which accommodates an engine does not satisfy a cooling condition, the case valves between all of the accommodation cases which are contiguous are caused to be open and the outside air valves corresponding to all of the contiguous accommodation cases are caused to be closed.

10. The vehicle according to claim 1, wherein
if, in an electric vehicle mode, the accommodation case which accommodates an engine does not satisfy a cooling condition, the case valves between all of the accommodation cases which are contiguous are caused to be open and the outside air valves corresponding to all of the contiguous accommodation cases are caused to be closed.

11. The vehicle according to claim 1, wherein
if, in an electric vehicle mode, the accommodation case which accommodates an engine does not satisfy a cooling condition, the case valves between all of the accommodation cases which are contiguous are caused to be open and the outside air valves corresponding to all of the contiguous accommodation cases are caused to be closed.

12. A vehicle comprising:
an outside air passage configured to be arranged in the vehicle and including a passage that configured to flow outside air in to the vehicle;
a first case arranged adjacent to the outside air passage, and configured to house a first unit of the vehicle;
a second case arranged adjacent to the outside air passage and the first case, and configured to house a second unit, other than the first unit, of the vehicle;
a first valve configured to open or close a first opening that communicates the outside air passage with the first case;
a second valve configured to open or close a second opening that communicates the outside air passage with the second case;
a third valve configured to open or close a third opening that communicates the first case and the second case; and
a controller coupled with the first valve, the second valve and the third valve, and configured to open or close the first valve, the second valve and the third valve on a basis of temperatures in the first case and the second case.

13. The vehicle according to claim 12, wherein the first unit is an engine of the vehicle.

14. The vehicle according to claim 13, wherein
the controller is configured to close the first valve and the second valve and open the third valve, when the vehicle traveling in an electric vehicle (EV) mode, when temperature in the first case is lower than a predetermined upper limit temperature set for the first case, and when temperature in the second case is lower than a predetermined upper limit temperature set for the second case.

15. The vehicle according to claim 12, wherein
the controller is configured to open the first valve and close the second valve and third valve, when temperature in the first case is higher than or equal to a predetermined upper limit temperature set for the first case.

16. The vehicle according to claim 12, wherein
the controller is configured to open the first valve, the second valve and the third valve, when temperature in the first case is higher than or equal to a predetermined upper limit temperature set for the first case, and when temperature in the second case is higher than or equal to a predetermined upper limit temperature set for the second case.

17. The vehicle according to claim 12, wherein
the controller is configured to close the first valve and the second valve and open the third valve, when temperature in the first case is lower than a predetermined upper limit temperature set for the first case and when temperature in the second case is lower than a predetermined upper limit temperature set for the second case.

* * * * *